United States Patent
Park et al.

(10) Patent No.: US 12,423,974 B2
(45) Date of Patent: Sep. 23, 2025

(54) VISION SENSOR, EVENT SIGNAL PROCESSING METHOD THEREOF, AND IMAGE PROCESSING DEVICE INCLUDING THE SAME

(71) Applicant: SAMSUNG ELECTRONICS CO., LTD., Suwon-si (KR)

(72) Inventors: Keunjoo Park, Suwon-si (KR); Junseok Kim, Suwon-si (KR); Junhyuk Park, Suwon-si (KR); Bongki Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 18/375,071

(22) Filed: Sep. 29, 2023

(65) Prior Publication Data
US 2024/0273901 A1    Aug. 15, 2024

(30) Foreign Application Priority Data

Feb. 10, 2023   (KR) ........................ 10-2023-0017878

(51) Int. Cl.
*H04N 25/68* (2023.01)
*G06V 10/60* (2022.01)
*G06V 20/40* (2022.01)

(52) U.S. Cl.
CPC .............. *G06V 20/44* (2022.01); *G06V 10/60* (2022.01)

(58) Field of Classification Search
CPC ......... H04N 25/68; H04N 25/683; G06T 5/70
See application file for complete search history.

(56) References Cited

U.S. PATENT DOCUMENTS

| | | | |
|---|---|---|---|
| 9,781,365 B2 * | 10/2017 | Subbotin | H04N 25/683 |
| 9,817,507 B2 | 11/2017 | Park et al. | |
| 11,202,025 B2 | 12/2021 | Park et al. | |
| 11,405,567 B2 | 8/2022 | Seo | |
| 2003/0063202 A1 * | 4/2003 | Toyoda | H04N 25/683 |
| | | | 348/E5.081 |
| 2007/0040920 A1 * | 2/2007 | Kinoshita | H04N 25/68 |
| | | | 348/E5.081 |

(Continued)

FOREIGN PATENT DOCUMENTS

| | | |
|---|---|---|
| JP | 2022-121991 A | 8/2022 |
| WO | 2022/152619 A1 | 7/2022 |

OTHER PUBLICATIONS

Yahiaoui et al., "Overview and Empirical Analysis of ISP Parameter Tuning for Visual Perception in Autonomous Driving", Journal of Imaging, Sep. 24, 2019, 27 total pages, vol. 5, No. 78, doi: 10.3390/jimaging5100078.

*Primary Examiner* — Frank Johnson
(74) *Attorney, Agent, or Firm* — Sughrue Mion, PLLC

(57) ABSTRACT

A vision sensor includes a memory; a pixel array including a plurality of pixels configured to generate an event signal by detecting an event in which an intensity of incident light changes; and an event detection circuit configured to read the event signal from the pixel array and configured to process the event signal, wherein the event detection circuit configured to: store, in the memory, a state map including a first state corresponding to a presence of an event of each of the plurality of pixels, and a second state corresponding to an absence of the event, and correct the event occurring in a selected pixel, based on the state map stored in the memory.

16 Claims, 16 Drawing Sheets

(56) References Cited

U.S. PATENT DOCUMENTS

| | | | |
|---|---|---|---|
| 2007/0291142 A1* | 12/2007 | Noh | H04N 25/134 |
| | | | 348/E5.079 |
| 2008/0285845 A1* | 11/2008 | Kang | H04N 25/683 |
| | | | 382/162 |
| 2018/0262705 A1* | 9/2018 | Park | H04N 25/40 |
| 2020/0029033 A1 | 1/2020 | Xu et al. | |
| 2020/0410272 A1 | 12/2020 | Seo et al. | |
| 2021/0044769 A1* | 2/2021 | Maruyama | H04N 23/60 |
| 2022/0053154 A1 | 2/2022 | Kitano | |
| 2023/0209220 A1* | 6/2023 | Nishio | H04N 25/683 |
| | | | 348/242 |

* cited by examiner

VISION SENSOR, EVENT SIGNAL PROCESSING METHOD THEREOF, AND IMAGE PROCESSING DEVICE INCLUDING THE SAME

CROSS-REFERENCE TO RELATED APPLICATION

This application is based on and claims priority under 35 USC § 119 to Korean Patent Application No. 10-2023-0017878, filed on Feb. 10, 2023, in the Korean Intellectual Property Office, the disclosure of which is incorporated by reference herein in its entirety.

BACKGROUND

1. Field

The disclosure relates to a vision sensor and an image processing device including the vision sensor.

2. Description of Related Art

Human-computer interaction (HCI) is expressed in a user interface to work. A variety of user interfaces that recognize a user's input may provide natural interaction between humans and computers. Various sensors may be used to recognize a user's input.

In general, image sensors may be largely classified as some image sensors that operate synchronously and other image sensors that operate asynchronously. A non-limiting, representative example of the image sensors that operates synchronously is a complementary metal-oxide semiconductor (CMOS) image sensor. A non-limiting, representative example of the image sensors that operates asynchronously is a dynamic vision sensor (DVS).

The DVS may detect a change in intensity of incident light to generate an event signal and transmits the event signal to a processor.

In general, the size of pixels constituting a DVS is significantly larger than that of pixels of an image sensor of the related art, such as a CMOS image sensor. Therefore, a defect of the pixel itself constituting the DVS is an important issue in terms of quality of images provided to users and in yield in a manufacturing process. However, because there is a limit to improving the yield only by improving the manufacturing process, it may be very important to improve defective pixels by using hardware or software (firmware).

SUMMARY

Provided is a vision sensor having improved performance by correcting an event occurring in a bad pixel or a selected pixel and a method thereof.

According to an aspect of the disclosure, a vision sensor includes: a memory; a pixel array including a plurality of pixels configured to generate an event signal by detecting an event in which an intensity of incident light changes; and an event detection circuit configured to read the event signal from the pixel array and configured to process the event signal, wherein the event detection circuit configured to: store, in the memory, a state map including a first state corresponding to a presence of an event of each of the plurality of pixels, and a second state corresponding to an absence of the event, and correct the event occurring in a bad pixel or a selected pixel, based on the state map stored in the memory.

According to another aspect of the disclosure, a method performed by a vision sensor, the method includes: detecting an event in which an intensity of incident light changes and reading an event signal from a pixel array including a plurality of pixels configured to generate an event signal; storing, in a memory, a state map including a first state corresponding to a presence of an event of each of the plurality of pixels, and a second state corresponding to an absence of the event; and correcting the event occurring in a bad pixel or a selected pixel based on the state map stored in the memory.

According to another aspect of the disclosure, an image processing device including a vision sensor and an image sensor, wherein the vision sensor includes: a pixel array including a plurality of pixels configured to generate an event signal by detecting an event in which an intensity of incident light changes; and an event detection circuit configured to read the event signal from the pixel array and configured to process the event signal, wherein the event detection circuit is configured to store, in a memory, a state map including a first state corresponding to a presence of an event of each of the plurality of pixels, and a second state corresponding to an absence of an event, and wherein the event detection circuit is configured to correct an event occurring in a bad pixel or a selected pixel, based on the state map stored in the memory.

BRIEF DESCRIPTION OF DRAWINGS

Embodiments are more clearly understood from the following detailed description taken in conjunction with the accompanying drawings in which.

DETAILED DESCRIPTION

Figure 1:
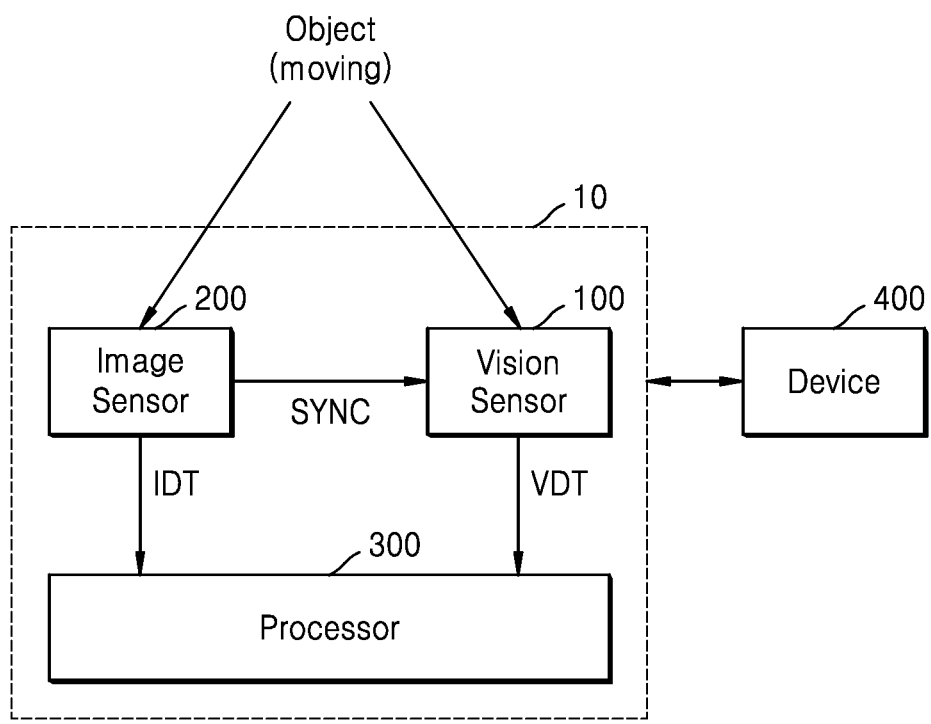
FIG. 1 is a block diagram illustrating an image processing device according to an embodiment.

Hereinafter, embodiments are described in detail with reference to the accompanying drawings. The embodiments described herein are example embodiments, and thus, the disclosure is not limited thereto and may be realized in various other forms. The embodiments may be described and illustrated herein in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

FIG. 1 is a block diagram illustrating an image processing device 10 according to an embodiment.

Referring to FIG. 1, the image processing device 10 may include at least one of a vision sensor 100 and an image sensor 200 and a processor 300. The image processing device 10 according to an embodiment may be mounted in an electronic device having an image or light sensing function. For example, the image processing device 10 may include cameras, smartphones, wearable devices, Internet of things (IoT) devices, tablet personal computers (PCs), personal digital assistants (PDAs), portable multimedia players (PMPs), navigation devices, drones, and advanced driver assistance systems (ADAS). In addition, the image processing device 10 may be provided as a component in vehicles, furniture, manufacturing facilities, doors, and various measuring devices.

The vision sensor 100 may be an event-based vision sensor. The vision sensor 100 may output an event signal by detecting a change in intensity of incident light. The vision sensor 100 may be a dynamic vision sensor that outputs event signals for pixels in which a change in intensity of light is detected, that is, to pixels in which an event occurs. When an event in which the intensity of light increases occurs, the vision sensor 100 may output an ON-event corresponding thereto. Conversely, when an event in which the intensity of light decreases occurs, the vision sensor 100 may output an OFF-event. The change in intensity of light may result from movement of an object captured by the vision sensor 100 or flickering (e.g., lighting, a display screen, etc.?) of the object. Also, the change in intensity of light may result from movement of the vision sensor 100 or the image processing device 10 itself. The vision sensor 100 may periodically or aperiodically transmit vision sensor data VDT including event signals to the processor 300.

The vision sensor 100 may be a frame-based vision sensor. For example, the vision sensor 100 may output event signals by scanning all pixels constituting the vision sensor 100 at each reference period. However, unlike a general CMOS image sensor, the vision sensor 100 may not output event signals for all pixels and may output event signals only for pixels in which a change in intensity of light is detected. In this case, an event signal output from the vision sensor 100 may be converted into a synchronous event signal by a processor or the like.

In an embodiment, the vision sensor 100 may transmit, to the processor 300, an image frame generated by the image sensor 200 based on a synchronization signal SYNC received from the image sensor 200 and vision sensor data VDT including an event signal generated by the vision sensor 100.

In another embodiment, the vision sensor 100 may generate a time stamp capable of matching the image frame generated by the image sensor 200 based on the synchronization signal SYNC received from the image sensor 200 to the event signal generated by the vision sensor 100, and transmit, to the processor 300, vision sensor data VDT including the generated time stamp. The time stamp may include information on a time point when the image sensor 200 is exposed, a time point when an image frame is generated, or a time point when an event signal of the vision sensor 100 is generated.

For example, using a self-initialization circuit and a counter included in each pixel of the vision sensor 100, the vision sensor 100 may transmit, to the processor 300, vision sensor data VDT including whether an event occurs and the amount of change in illumination caused by the event.

In addition, using a synchronization signal SYNC received from the image sensor 200 or an internal signal of the vision sensor 100, the vision sensor 100 may output a device synchronization signal for synchronizing external devices including the image sensor 200 with the vision sensor 100. The vision sensor 100 may output a plurality of device synchronization signals and individually control the device synchronization signals.

The image sensor 200 may convert an optical signal of an object incident through an optical lens into an electrical signal and generate and output image sensor data IDT based on the electrical signal. The image sensor 200 may include, for example, a pixel array, which includes a plurality of two-dimensionally arranged pixels, and a readout circuit, and the pixel array may convert received optical signals into electrical signals. The pixel array may be implemented as photoelectric conversion devices, such as charge-coupled devices (CCDs) or complementary metal oxide semiconductors (CMOSs), and may also be implemented as various types of photoelectric conversion devices. The read-out circuit may generate raw data based on an electrical signal provided from the pixel array and output the raw data or raw data obtained by performing preprocessing, such as removing bad pixels, as image sensor data IDT. The image sensor 200 may be implemented as a semiconductor chip or package including a pixel array and a readout circuit.

The image sensor 200 may generate a synchronization signal SYNC to be transmitted to the vision sensor 100 in order to synchronize the vision sensor 100 with the image sensor 200. The synchronization signal SYNC may be generated by considering shutter signal information, readout signal information, or image frame information of the image sensor 200.

The processor 300 may perform image processing on the image sensor data IDT provided from the image sensor 200. For example, the processor 300 may perform image processing for changing a data format of the image sensor data IDT (e.g., changing image data of a Bayer pattern into a YUV or RGB format), image processing for improving image quality, such as noise removal, brightness adjustment, and sharpness adjustment. The processor 300 may process the vision sensor data VDT received from the vision sensor 100 and may detect movement of an object (or movement of an object in an image recognized by the image processing device 10), based on an event signal in the vision sensor data VDT.

In addition, the processor 300 may match the image frame included in the image sensor data IDT provided from the image sensor 200 to the vision sensor data VDT received from the vision sensor 100 using the time stamp and pieces of synchronization signal information.

For example, using the time stamp and the pieces of synchronization signal information, the processor 300 may match the vision sensor data VDT including information on whether an event occurs and the amount of change in illumination due to the occurrence of an event to the image sensor data IDT, thereby effectively applying an algorithm (e.g., a CMOS image sensor (CIS) deblur algorithm) for removing motion blur due to movement of an object in image data.

The processor 300 may process signals detected by the vision sensor 100.

The processor 300 may include an application specific integrated circuit (ASIC), a field-programmable gate array (FPGA), a dedicated microprocessor, a microprocessor, and the like. Alternatively, the processor 300 may include a general-purpose processor.

The image processing device 10 of the disclosure may improve performance of the image processing device 10 by correcting an event signal output from a defective pixel among pixels constituting the vision sensor 100. Because defective pixels may be treated similar to normal pixels by this scheme, the effect of improving the yield of the pixel array constituting the vision sensor 100 may be achieved.

In addition, each of the vision sensor 100, the image sensor 200, and the processor 300 may be implemented as an integrated circuit (IC). For example, the vision sensor 100, the image sensor 200, and the processor 300 may be implemented as separate semiconductor chips. Alternatively, the vision sensor 100, the image sensor 200, and the processor 300 may be implemented as a single chip. For example, the vision sensor 100, the image sensor 200, and the processor 300 may be implemented as a system-on-chip (SoC).

The image processing device 10 may control a device 400 outside the image processing device 10 and collect data from the external device 400. Using the time stamp, the image processing device 10 may match the vision sensor data (VDT) with the data collected from the device 400. The device 400 may include an acceleration sensor, an inertial measurement unit (IMU), a gyro sensor, an infrared (IR) light-emitting diode (LED), and a flash light.

Figure 2:
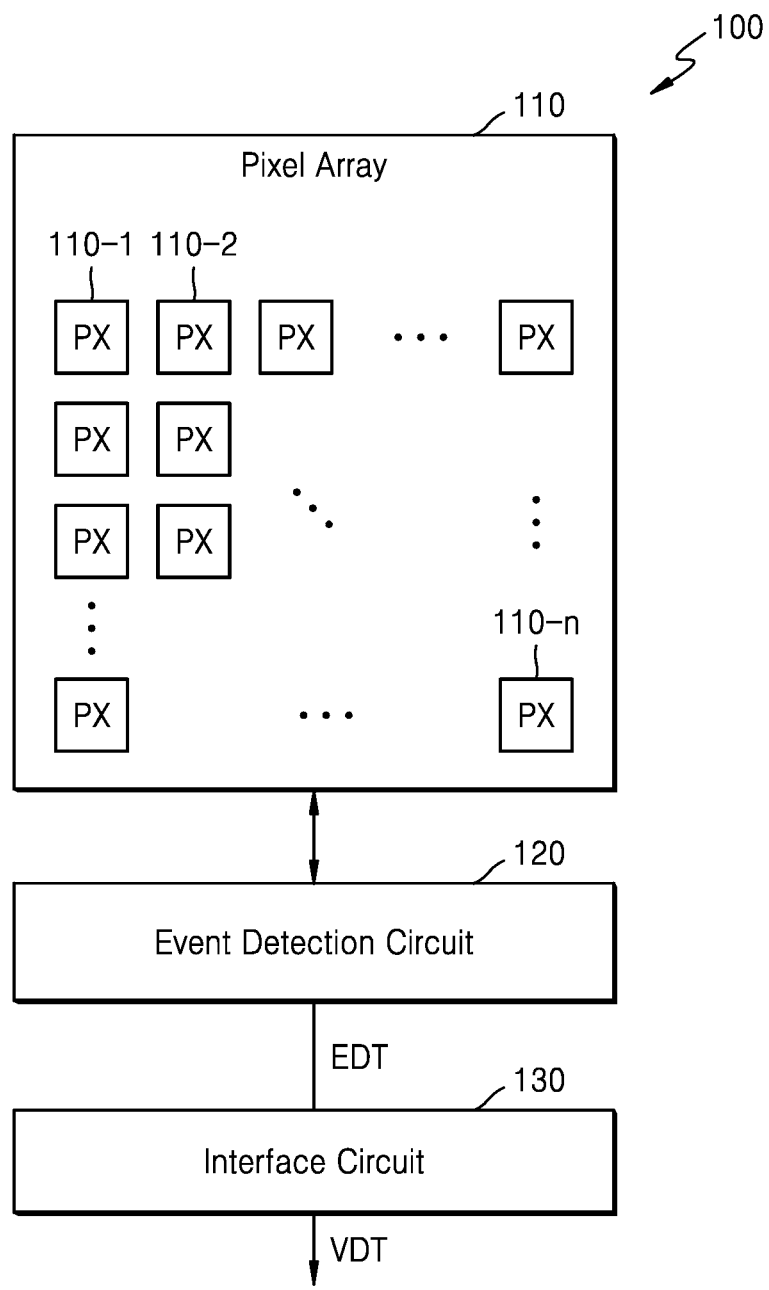
FIG. 2 is a block diagram illustrating a vision sensor according to an embodiment.

FIG. 2 is a block diagram illustrating the vision sensor 100 according to an embodiment.

In detail, FIG. 2 is a block diagram illustrating the vision sensor 100 of FIG. 1.

Referring to FIGS. 1 and 2, the vision sensor 100 may include a pixel array 110, an event detection circuit 120 and an interface circuit 130.

The pixel array 110 may include a plurality of pixels PX (e.g., 110-1 to 110-n) arranged in a matrix of n rows and m columns. Each of the pixels PX may generate an event signal by detecting events in which the intensity of incident light increases or decreases. For example, each of the pixels PX may be connected to the event detection circuit 120 through a column line extending in the column direction and a row line extending in the row direction. In an embodiment, a signal indicating that an event occurs and polarity information of the event (i.e., whether it is an ON event in which the intensity of light increases or an OFF event in which the intensity of light decreases) may be output from the pixel PX in which the event occurs to the event detection circuit 120. In another embodiment, the polarity information of the event may be omitted, so that a signal notifying that the event occurs may be output from the pixel PX in which the event occurs to the event detection circuit 120.

The event detection circuit 120 may read an event signal from the pixel array 110 and process the event signal. The event detection circuit 120 may generate event data EDT including an address of the pixel PX in which the event occurs. In an embodiment, the event data EDT may include not only the address of the pixel PX in which the event occurs, but also polarity information and the time stamp of the event. The event detection circuit 120 may process events occurring in the pixel array 110 in units of pixels PX, in units of pixel PX groups including a plurality of pixels PX, or in units of columns or frames. In an embodiment, the event detection circuit 120 may process k consecutive column units as a single frame.

The event detection circuit 120 may include a column scanner circuit, a row event readout circuit, an address event representation (AER) unit, an event signal processing unit (ESP), and a bias generator.

The column scanner circuit of the event detection circuit 120 may scan the pixels PX constituting the pixel array 110 in units of columns. In an embodiment, the column scanner circuit may transmit a select signal to a column to be scanned among a plurality of columns of the pixel array 110 to scan the pixels PX included in the column to be scanned.

The pixels PX included in the column to be scanned may transmit, to the row event readout circuit, polarity information indicating whether an event in which the intensity of light increases or decreases occurs, in response to the select signal.

The row event readout circuit of the event detection circuit 120 may receive the polarity information from the pixels PX included in the column to be scanned. The row event readout circuit may transmit an initialization signal INT to a pixel PX in which an event (e.g., an ON event or an OFF event) occurs, in response to the polarity information. The pixel PX in which the event occurs may be initialized in response to the initialization signal INT.

The ESP unit of the event detection circuit 120 may generate event data EDT based on an address ADDR, polarity information, and the time stamp TS received from the AER unit.

The interface circuit 130 may receive the event data EDT and transmit the vision sensor data VDT to the processor 300 according to a set protocol. The interface circuit 130 may generate vision sensor data VDT by packing the event data EDT and the time stamp TS in units of individual signals, in units of packets, or in units of frames according to the set protocol and transmit the vision sensor data VDT to the processor 300. For example, the interface circuit 130 may include one of an AER interface, a mobile industry processor interface (MIPI) interface, and a parallel interface.

A packet including at least one of event data EDT and the time stamp TS may be output as the vision sensor data VDT from the interface circuit 130. The packet may include the time stamp TS and the address of the event data EDT and polarity information, and the arrangement order thereof is not limited. A header indicating the start of the packet may be added to the front end of the packet and a tail indicating the end of the packet may be added to the rear end of the packet. The packet may include at least one event signal.

Figure 3:
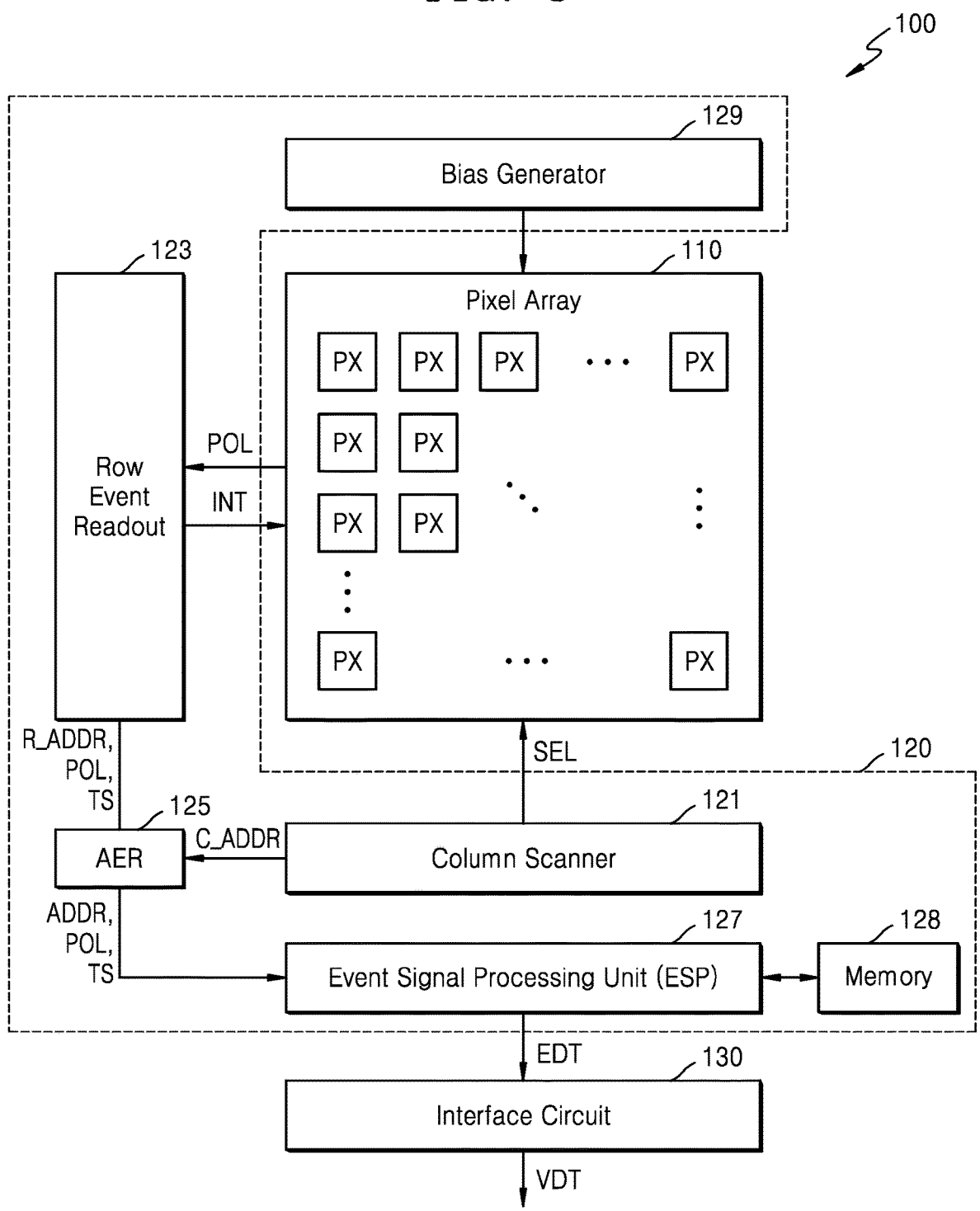
FIG. 3 is a block diagram illustrating the vision sensor of FIG. 2 in detail.

FIG. 3 is a block diagram illustrating the vision sensor 100 of FIG. 2 in detail.

Referring to FIGS. 2 and 3, the vision sensor 100 includes the pixel array 110, the event detection circuit 120, and the interface circuit 130. The event detection circuit 120 may include a column scanner circuit 121, a row event readout circuit 123, an AER 125, an ESP 127, a memory 128, and a bias generator 129. In addition to this, the vision sensor 100 may additionally include components, such as an event rate controller that adjusts an event detection rate. Because the pixel array 110 and the interface circuit 130 have been described above with reference to FIG. 2, redundant descriptions thereof are omitted.

The column scanner circuit 121 may scan the pixels PX constituting the pixel array 110 in units of columns. In an embodiment, the column scanner circuit 121 may transmit a select signal SEL to a column to be scanned among a plurality of columns of the pixel array 110 to scan the pixels PX included in the column to be scanned.

The pixels PX included in the column to be scanned may transmit, to the row event readout circuit 123, polarity information POL indicating whether an event in which the intensity of light increases or decreases occurs, in response to the select signal SEL. The polarity information POL may include information on an ON event in which the intensity of light increases and an OFF event in which the intensity of light decreases. The polarity information POL may include 1 bit including information on whether an ON event occurs and 1 bit including information on whether an OFF event occurs. In some embodiments, the pixels PXs included in the column to be scanned may transmit information regarding whether an event in which the intensity of light increases or decreases occurs, excluding the polarity information POL, to the row event readout circuit 123, in response to the select signal SEL. Furthermore, an implementation method of the polarity information POL is not limited to the above example and may be implemented in various manners. Also, the column scanner circuit 121 may generate a column address C_ADDR of the pixel PX in which the event occurs.

The row event readout circuit 123 may receive information on whether an event in which the intensity of light increases or decreases occurs, from the pixels PX included in the column to be scanned. In detail, the row event readout circuit 123 may receive the polarity information POL from the pixels PX included in the column to be scanned. The row event readout circuit 123 may transmit the initialization signal INT to the pixel PX in which an event (e.g., an ON event or an OFF event) occurs, in response to the polarity information POL. The pixel PX in which the event occurs may be initialized in response to the initialization signal INT. Also, based on the received polarity information POL, the row event readout circuit 123 may generate a row address R_ADDR of the pixel PX in which an event occurs. In addition, based on the polarity information POL, the row event readout circuit 123 may generate a time stamp TS including information on an event occurrence time. In some embodiments, the time stamp TS may be generated by a time stamper provided in the row event readout circuit 123. For example, the time stamper may be implemented using a timetick generated in units of several to tens of microseconds.

The AER 125 may receive the row address R_ADDR, polarity information POL, and time stamp TS from the row event readout circuit 123 and receive the column address C_ADDR from the column scanner circuit 121. The AER 125 may generate an address ADDR of the pixel PX in which an event occurs, based on the row address R_ADDR and the column address C_ADDR. The AER 125 may transmit the address ADDR, polarity information POL, and time stamp TS to the ESP 127.

The ESP 127 may generate event data EDT based on the address ADDR, polarity information POL, and time stamp TS received from the AER 125. In an embodiment, the ESP 127 may generate the event data EDT for valid events. In addition, the ESP 127 may generate the event data EDT for valid events, as well as correcting events occurring in bad pixels or selected pixels. Bad pixels or selected pixels may be classified as a hot pixel and a dead pixel. The hot pixel may be bad because the hot pixel generates an event signal (e.g., polarity information) even though there is no event in which the intensity of light changes. The dead pixel may be bad because the dead pixel does not generate an event signal even though there is an event in which the intensity of light changes. The ESP 127 may correct an event occurring in the bad pixel or the selected pixel by removing a noise event occurring in a hot pixel or restoring a missed event in a dead pixel.

For example, when the amount of events occurring in surrounding pixels adjacent to a target pixel is less than a preset threshold value, the ESP 127 may determine the target pixel as a hot pixel and may not generate event data EDT for a noise event signal generated in the hot pixel. In addition, when the amount of events for the target pixel and surrounding pixels arranged in one direction with respect to the target pixel and the surrounding pixels adjacent to the target pixel exceeds a preset threshold value, the ESP 127 may determine the target pixel as a dead pixel and generate event data EDT for an event signal omitted by the dead pixel.

The ESP 127 may map and store the state of each of the pixels in the presence or absence of an event in a memory. For example, the ESP 127 may map a pixel in which an event occurs to a first state, map a pixel in which an event does not occur to a second state, and store the first and second states in the memory. However, the embodiment is not limited thereto, and the ESP 127 may map the state of each of the pixels in the presence or absence of an event and store the states in a status register constituting the ESP 127. The status register may include a column register.

The memory may store a state map. The memory may store the first state as logic high and the second state as logic low. The memory may include the same number of flip-flops as that of the pixels. Because the state map indicates whether an event occurs in a pixel, the state map has 1-bit data per pixel.

The bias generator 129 may generate a voltage to be provided to the pixel array 110. For example, the bias generator 129 may generate threshold voltages or bias voltages used to detect an ON event and an OFF event in the pixel PX. The bias generator 129 may change voltage levels of threshold voltages provided to the pixels PXs and may change the voltage levels of the threshold voltages for each pixel PX to be different from each other.

Figure 4:
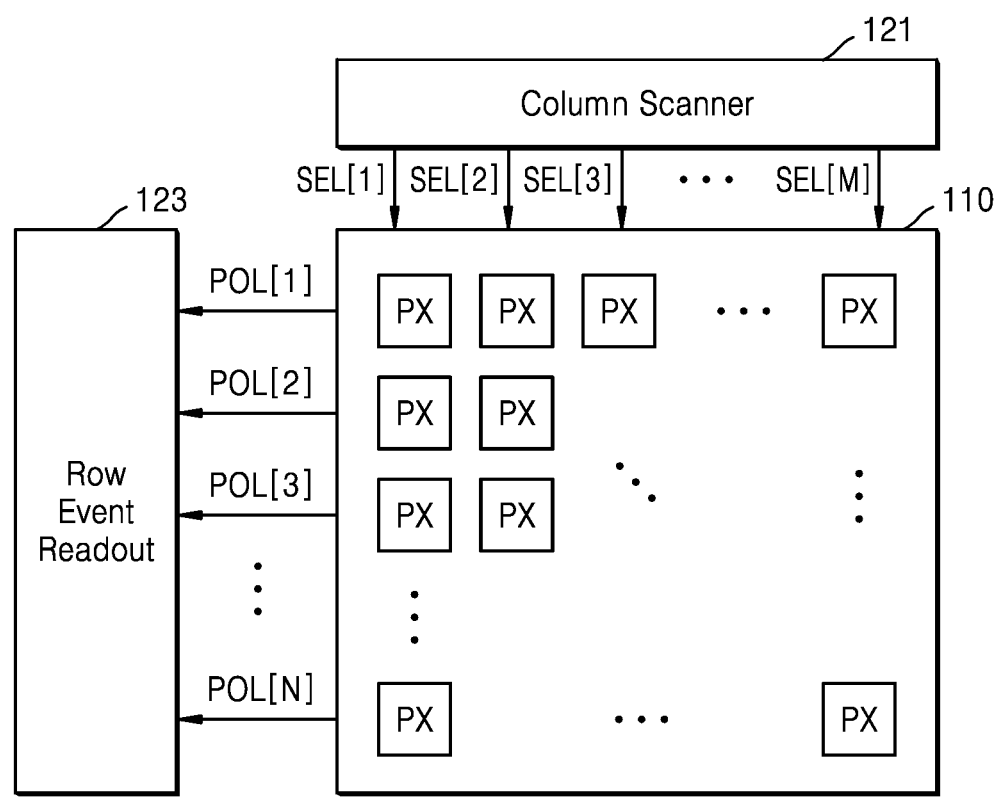
FIG. 4 is a conceptual diagram illustrating an operation of generating polarity information of a vision sensor, according to an embodiment.

FIG. 4 is a conceptual diagram illustrating an operation of generating polarity information of a vision sensor, according to an embodiment. In detail, FIG. 4 is a conceptual diagram illustrating an operation of generating the polarity information POL of the vision sensor 100 of FIG. 3.

Referring to FIGS. 3 and 4, the column scanner circuit 121 may scan the pixel array 110 in units of columns. In an embodiment, using select signals SEL[1] to SEL[M] corresponding to M (M is a positive integer) columns, respectively, the column scanner circuit 121 may scan the pixel array 110 in units of columns. The select signals SEL[1] to SEL[M] may have an active level (e.g., logic high) indicating column selection and an inactive level (e.g., logic low) indicating column non-selection. The column scanner circuit 121 may scan the pixel array 110 in units of columns by sequentially transitioning the select signals SEL[1] to SEL[M] to active levels. However, the disclosure is not limited thereto, and the column scanner circuit 121 may be implemented to transition the select signals SEL[1] to SEL[M] to active levels in a random order.

When a select signal of a certain column transitions to an active level, each of N (N is a positive integer) pixels PX included in the corresponding column may provide, to the row event readout circuit 123, polarity information indicating whether an event occurs. In an embodiment, the N pixels PX may transmit polarity information POL[1] to POL[N] respectively corresponding to the pixels PX to the row event readout circuit 123. The polarity information POL[1] to POL[N] may have an active level (e.g., logic low) indicating occurrence of an event and an inactive level (e.g., logic high) indicating non-occurrence of an event. In some embodiments, each of the polarity information POL[1] to POL[N] may include first polarity information indicating whether an ON event (an event in which the change in intensity of light increases) occurs and second polarity information indicating whether an OFF event (an event in which the change in intensity of light decreases) occurs.

The row event readout circuit 123 may receive the polarity information POL[1] to POL[N] of the N pixels PX, provide the initialization signal INT to the pixel PX in which an event occurs, based on the polarity information POL[1] to POL[N], and generate the row address R_ADDR and the time stamp TS.

Figure 5:
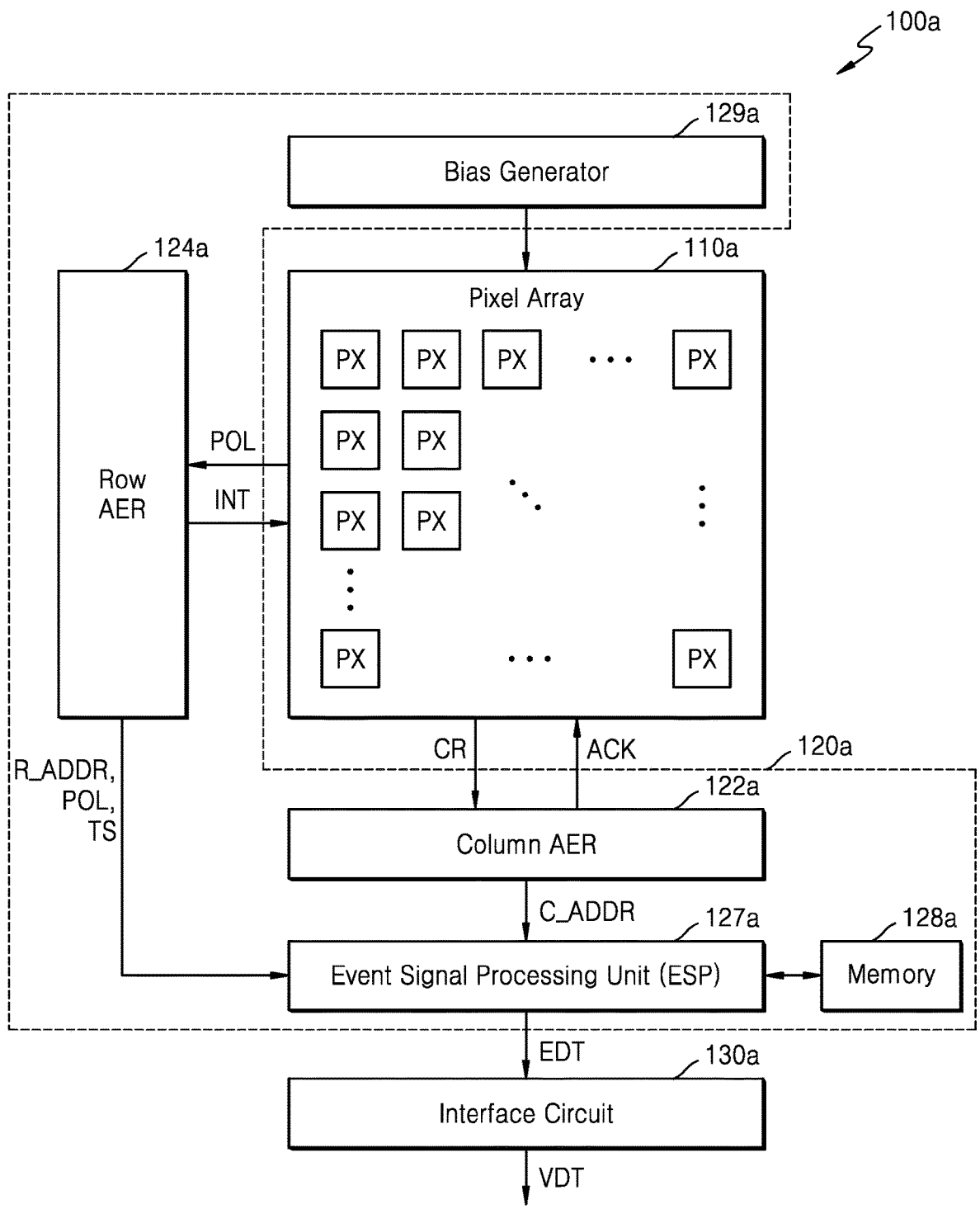
FIG. 5 is a block diagram illustrating the vision sensor of FIG. 2 in detail.

FIG. 5 is a block diagram illustrating the vision sensor 100 of FIG. 2 in detail. A vision sensor 100a of FIG. 5 is a modified embodiment of the vision sensor 100 of FIG. 3.

Referring to FIG. 5, the vision sensor 100a may include a pixel array 110a, an event detection circuit 120a, and an interface circuit 130a, and the event detection circuit 120a may include a column AER 122a, a row AER 124a, a bias generator 129a, an ESP 127a, and a memory 128a. In addition to this, the vision sensor 100a may further include components, such as an event rate controller that adjusts an event detection rate.

Because the pixel array 110a and the interface circuit 130a may respectively correspond to the pixel array 110 and the interface circuit 130 of FIG. 2, redundant descriptions are omitted. In addition, because the bias generator 129a may correspond to the bias generator 129 of FIG. 3, redundant descriptions are omitted.

According to an embodiment, a pixel PX detecting an event (e.g., an ON event or an OFF event) among the pixels PX constituting the pixel array 110a may transmit a column request CR, which is a signal indicating that an event occurs, to the column AER 122a.

The column AER 122a may receive the column request CR from the pixel PX in which an event occurs. The column AER 122a may transmit a response signal ACK to the pixel PX in which an event occurs, in response to the received column request CR. Also, based on the received column request, the column AER 122a may generate a column address C_ADDR of the pixel PX in which an event occurs.

The pixel PX in which an event occurs may transmit the polarity information POL to the row AER 124a in response to the response signal ACK. Because an implementation example of the polarity information POL may be substantially the same as that described above with reference to FIG. 3, redundant descriptions are omitted.

The row AER 124a may receive the polarity information POL from the pixel PX in which an event occurs. The row AER 124a may transmit an initialization signal INT to the pixel PX in which an event occurs, in response to the polarity information POL. The pixel PX in which an event occurs may be initialized in response to the initialization signal INT. Also, based on the received polarity information POL, the row AER 124a may generate a row address R_ADDR of the pixel PX in which an event occurs. In addition, based on the polarity information POL, the row AER 124a may generate a time stamp TS including information on a time at which event occurs. In some embodiments, the time stamp TS may be generated by a time stamper provided in the row AER 124a. For example, the time stamper may be implemented using a timetick generated in units of several to tens of microseconds.

Referring to FIG. 5, operations of the row AER 124a and the column AER 122a have been described based on the assumption that information (e.g., the column request CR and the polarity information POL) related to the occurrence of an event is read from the pixel array 110a in units of columns. However, the operations of the row AER 124a and the column AER 122a are not limited thereto, and the row AER 124a and the column AER 122a may read information related to the occurrence of an event from the pixel in which an event occurs in various manners. For example, information related to the occurrence of an event may be read from the pixel array 110a in units of rows, and the operations of the row AER 124a and the column AER 122a may be exchanged, that is, the column AER 122a may receive the polarity signal. POL and transmit the initialization signal INT to the pixel array 110a. In addition, the row AER 124a and the column AER 122a may individually access the pixel PX in which an event occurs.

The ESP 127a may generate event data EDT based on the column address C_ADDR, row address R_AEER, polarity information POL, and time stamp TS received from the row AER 124a and the column AER 122a.

Figure 6:
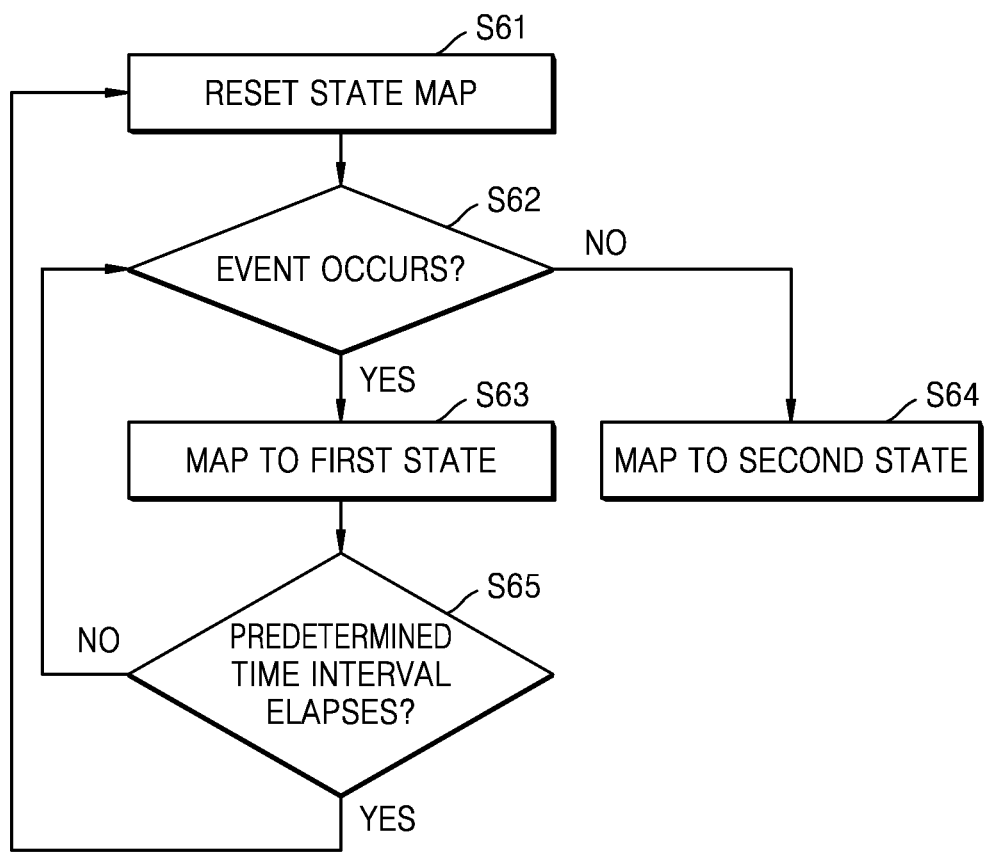
FIG. 6 is a flowchart illustrating an operation of mapping an event state of each of a plurality of pixels and storing the mapped event state in a memory by an event signal processor (ESP), according to an embodiment.

FIG. 6 is a flowchart illustrating an operation of mapping an event state of each of a plurality of pixels and storing a mapped event state in a memory by the ESP 127, according to an embodiment.

Figure 7:
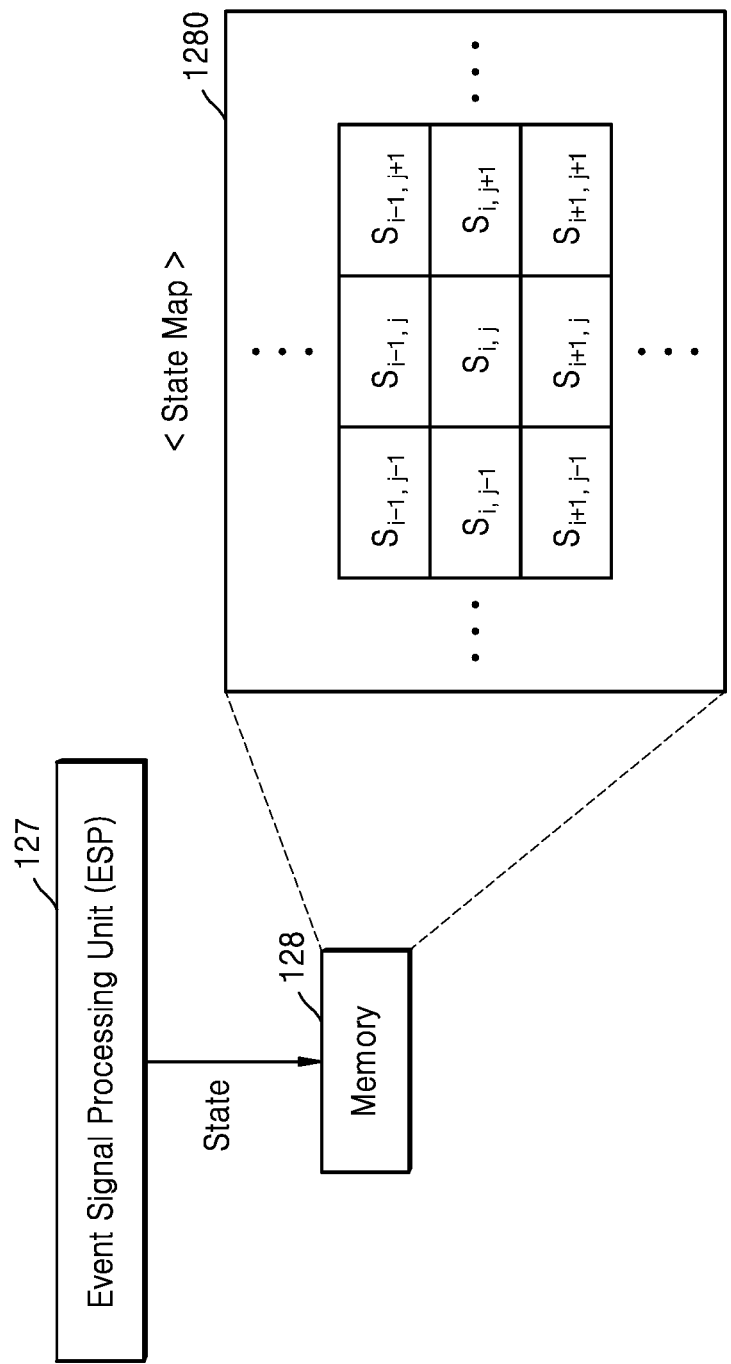
FIG. 7 is a block diagram illustrating an operation of mapping an event state of each of a plurality of pixels and storing a mapped event state in a memory by an ESP, according to an embodiment.

FIG. 7 is a block diagram illustrating an operation of mapping an event state of each of a plurality of pixels and storing the mapped event state in a memory by the ESP 127, according to an embodiment.

Referring to FIGS. 6 and 7, the ESP 127 may generate a state map 1280 using an event signal read from the pixel array. The event signal may include a signal indicating that an event occurs and polarity information of the event, but the polarity information of the event may be omitted if necessary. The state map 1280 may be stored in the memory 128. The state map 1280 includes coordinates of pixels in which an event occurs. In $S_{i,j}$ of the state map 1280, i,j denotes coordinates of pixels constituting the pixel array, wherein i denotes the row number and j denotes the column number. S represents the presence/absence of an event in each of the pixels. The state S may have a first state or a second state. The first state may be indicated by 1 as logic high and the second state may be indicated by 0 as logic low. A pixel in which an event occurs may be mapped to the first state, and a pixel without an event may be mapped to the second state. As a result, the ESP 127 may represent and store whether an event occurs in each pixel by 1-bit data.

The ESP 127 may generate the state map 1280 for each of the pixels constituting the pixel array. The memory 128 may require a memory capacity having the same number of bits as that of the pixels. In an embodiment, the memory 128 may include the same number of flip-flops as that of the pixels.

In another embodiment, the ESP 127 may generate the state map 1280 for some pixels rather than all of the pixels constituting the pixel array. For example, an event detection circuit may scan a plurality of pixels included in a pixel array of n rows and m columns column by column to read an event signal and process an event signal for pixel groups arranged in k consecutive columns as one frame. k may be an odd number greater than or equal to 3. For example, when k is 3, a plurality of pixels included in a pixel array of columns j−1, j, and j+1 may be processed as one frame. Because the event signal related to pixels included in the k consecutive columns is read in one frame, the ESP 127 may generate the state map 1280 for pixels included in the k columns. Because the number of pixels included in the k columns is n×k, memory capacity having the same number of n×k bits may be required. In an embodiment, a memory may include the same number of flip-flops as that of n×k pixels. In an embodiment, a memory may include k column memories.

However, the embodiment is not limited thereto, and the ESP 127 may map the state of each of the pixels in the presence or absence of an event and store the same in a status register constituting the ESP 127. The status register may include a column register.

In FIG. 6, the ESP 127 may reset the state map 1280 stored in the memory 128 at every predetermined reset period or at a predetermined time interval (S61). In other words, the ESP 127 may reset the state map 1280 stored in the memory 128 when a predetermined time interval elapses. The ESP 127 may reset the state map 1280 stored in the memory 128 by mapping the state of each of the pixels to 0.

The ESP 127 may determine whether an event occurs (S62). If the event occurs, the ESP 127 may map the state of each of the pixels to a first state (S63). If not, the ESP 127 may map the state of each of the pixels to a second state (S64).

When the ESP 127 maps the state of each of the pixels to the first state (S63) and when the predetermined time interval elapses (S65, YES), the ESP 127 may perform operation S61 (resetting the state map). When the ESP 127 maps the state of each of the pixels to the first state (S63) and when the predetermined time interval does not elapse (S65, NO), the ESP 127 may perform operation S62 (determining whether the event occurs).

Figure 8:
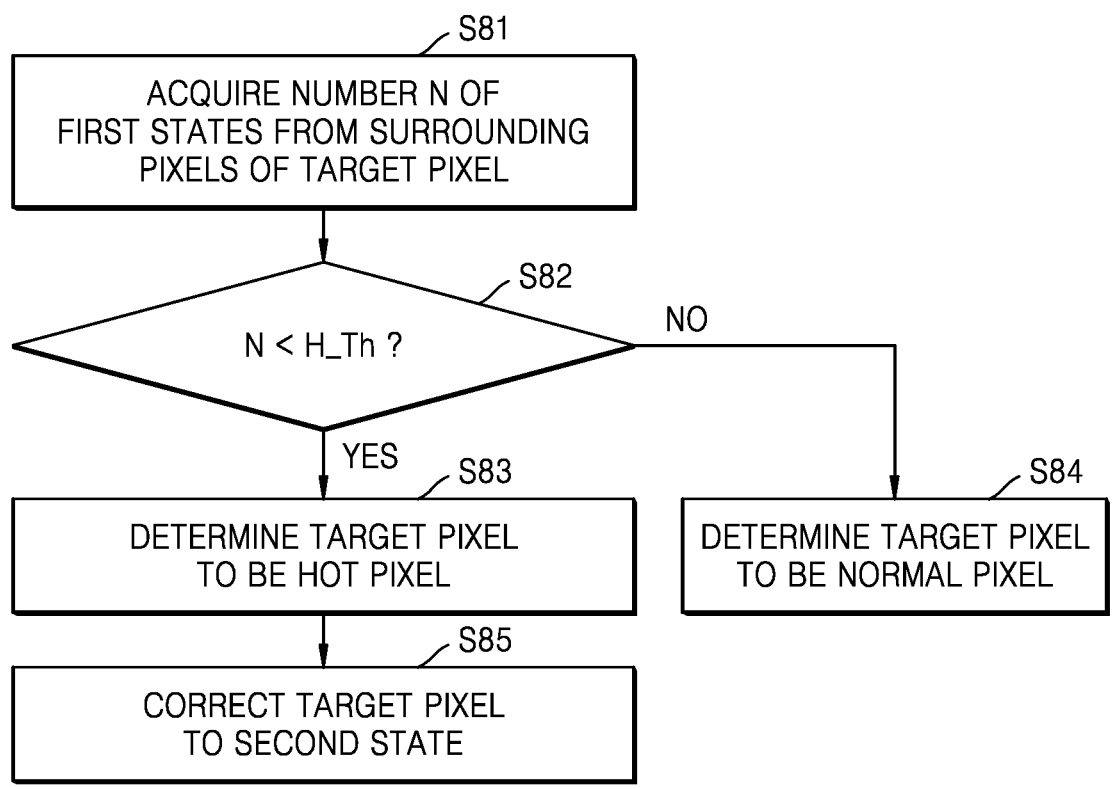
FIG. 8 is a flowchart illustrating an operation of removing a noise event generated in a hot pixel by an ESP, according to an embodiment.

FIG. 8 is a flowchart illustrating an operation of removing a noise event generated in a hot pixel by an ESP, according to an embodiment.

First, the ESP acquires the number N of first states from surrounding pixels adjacent to a target pixel (S81). The surrounding pixels may be 8 pixels adjacent to the target pixel. In another embodiment, the surrounding pixels may be a total of 24 pixels including 8 pixels adjacent to the target pixel and pixels surrounding the 8 pixels. The ESP compares the number N of the first states with a preset reference value H_Th (S82). When the number N of first states is less than the preset reference value H_Th, the ESP determines the target pixel as a hot pixel (S83). Also, the ESP determines the target pixel as a normal pixel when the number N of first states is greater than or equal to the preset reference value H_Th (S84).

The hot pixel is a bad pixel that generates an event signal (e.g., polarity information) even though there is no event of changing the intensity of light. A pixel in which an event occurs is mapped to the first state. When the number N of first states is small in the pixels adjacent to the target pixel, an event signal generated in the target pixel is highly likely to be a noise event. This is because it is highly unlikely that events occurring in two adjacent pixels within a certain time interval may rapidly change when considering motion of an object (or motion of an image processing device) that triggers the occurrence of an event.

The reference value H_Th may have an inverse relationship with a reset period for resetting the state map stored in the memory. This is because when the reset period is long, there is a high probability that the number N of first states increases in surrounding pixels adjacent to the target pixel. Accordingly, when the reset period is long, the ESP may be prevented from erroneously determining a hot pixel as a normal pixel by decreasing the reference value H_Th to be small.

The ESP determines the target pixel as a hot pixel by an event signal corresponding to the second state (S85). In an embodiment, the ESP may remove the event signal of the target pixel determined to be a hot pixel. In other words, the ESP may ignore the event signal generated by the hot pixel and may not generate event data EDT for the hot pixel.

Figure 9:
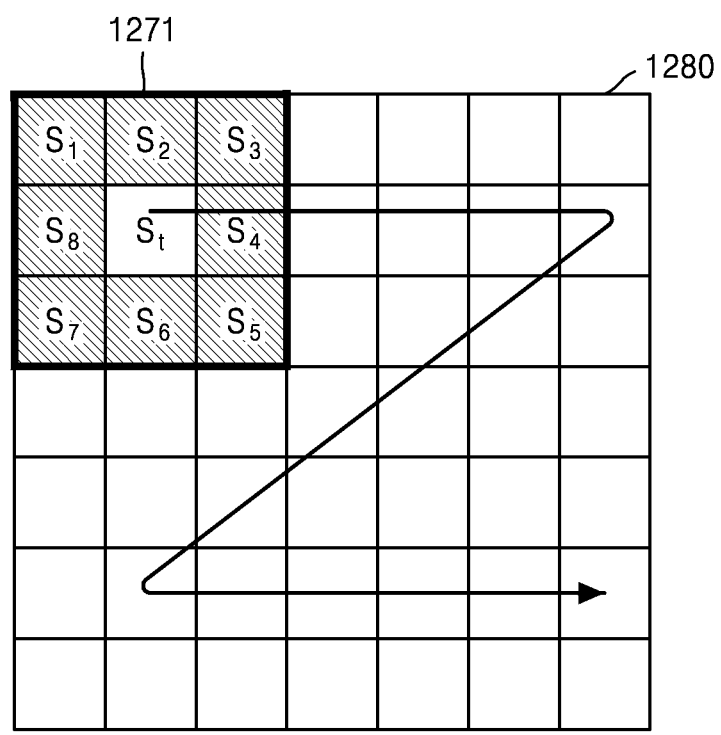
FIG. 9 illustrates an example of a shape of a filter according to an embodiment.

FIG. 9 illustrates an example of a shape of a first filter 1271 according to an embodiment.

The ESP may acquire the number N of first states from pixels adjacent to the target pixel by using the first filter 1271. The first filter 1271 may have a 3×3 size, a shaded portion may have a value of 1, and the center of the first filter 1271 may have a value of 0. In the first filter 1271, an operation may be performed between neighboring elements (elements indicated in black) adjacent to the center element of the first filter 1271. Filtering of the first filter 1271 may proceed in a direction of the arrow shown in FIG. 9 within the state map 1280 but is not limited thereto, and the direction of filtering may change according to design. Filtering of filters may be performed on each pixel. For example, filtering of filters may be performed on every pixel in the state map 1280. However, the disclosure is not limited thereto, and pixels on which filtering is performed may be determined according to designs.

First, the state map of the target pixel is $S_t$, state maps of surrounding pixels may be represented as $S_1$ to $S_8$, respectively. The ESP may acquire the number N of first states from the pixels adjacent to the target pixel based on the target pixel.

Figure 10:
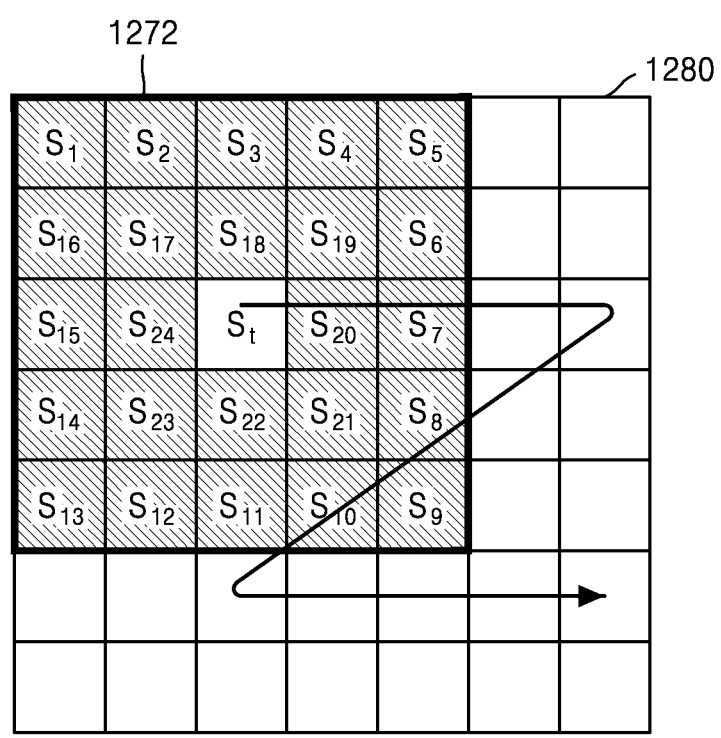
FIG. 10 illustrates an example of a shape of a filter according to an embodiment.

FIG. 10 illustrates an example of a shape of a second filter 1272 according to an embodiment.

The ESP may acquire the number of first states from pixels adjacent to a target pixel by using the second filter 1272. Unlike the first filter 1271 of FIG. 9, the size of the second filter 1272 is 5×5. A shaded portion of the second filter 1272 may have a value of 1, and the bright portion located in the center of the second filter 1272 may have a value of 0. In the second filter 1272, an operation may be performed between neighboring elements adjacent to the central element of the filter. In the embodiment of FIG. 10, the surrounding pixels may be a total of 24 pixels including 8 pixels adjacent to the target pixel and pixels surrounding the 8 pixels. Accordingly, when the number of first states is acquired from the surrounding pixels adjacent to the target pixel using the second filter 1272, the amount of calculations may increase, compared to that of the first filter 1271. However, because it is determined whether the target pixel is a hot pixel by acquiring the number of first states from the pixels adjacent to the target pixel and from the surrounding pixels, the accuracy of determining a hot pixel may further increase. That is, the amount of calculations and the accuracy of hot pixel determination may be in a trade-off relationship.

Figure 11:
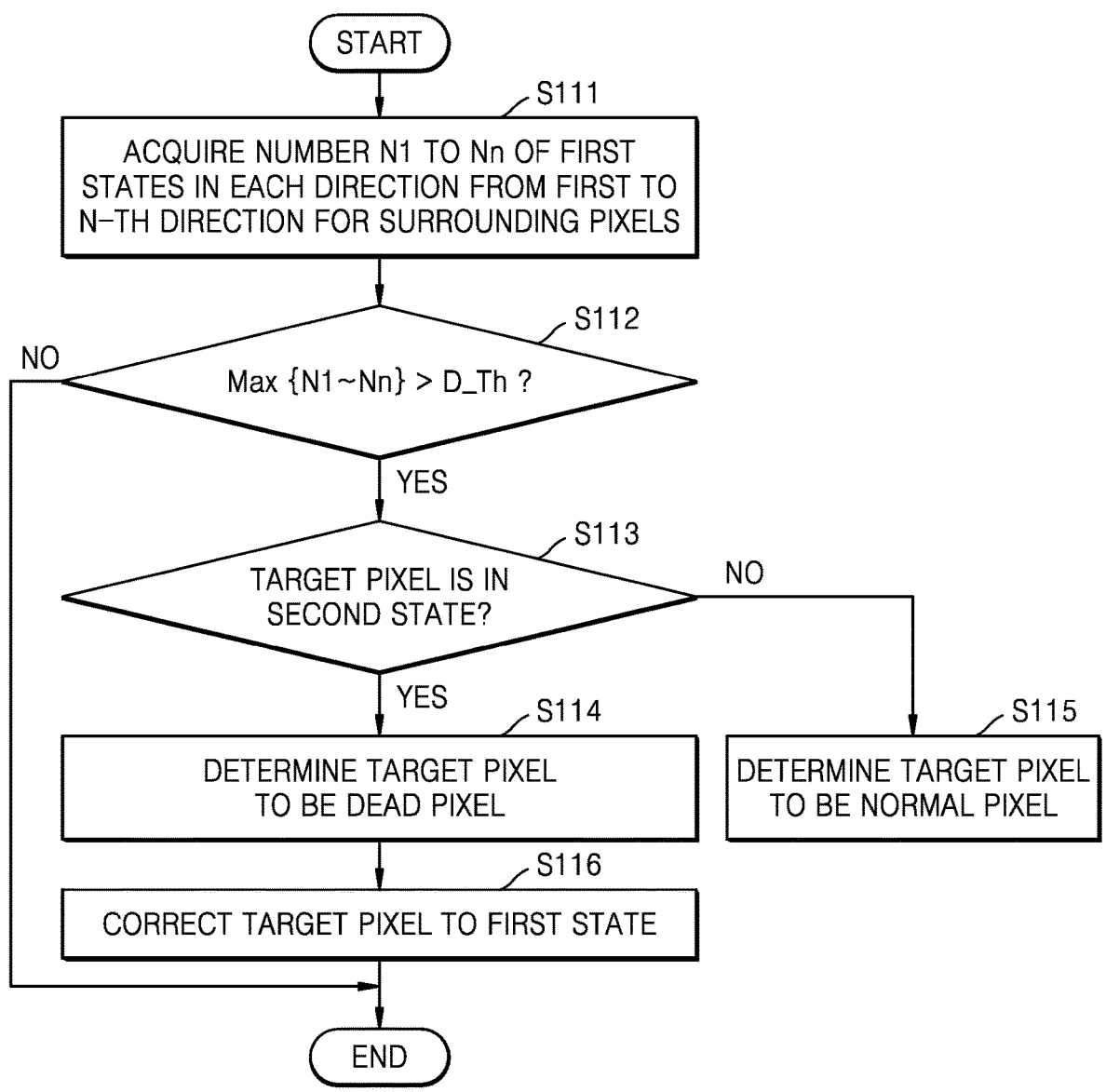
FIG. 11 is a flowchart illustrating an operation of restoring a missing event omitted in a dead pixel by an ESP, according to an embodiment.
Figure 12:
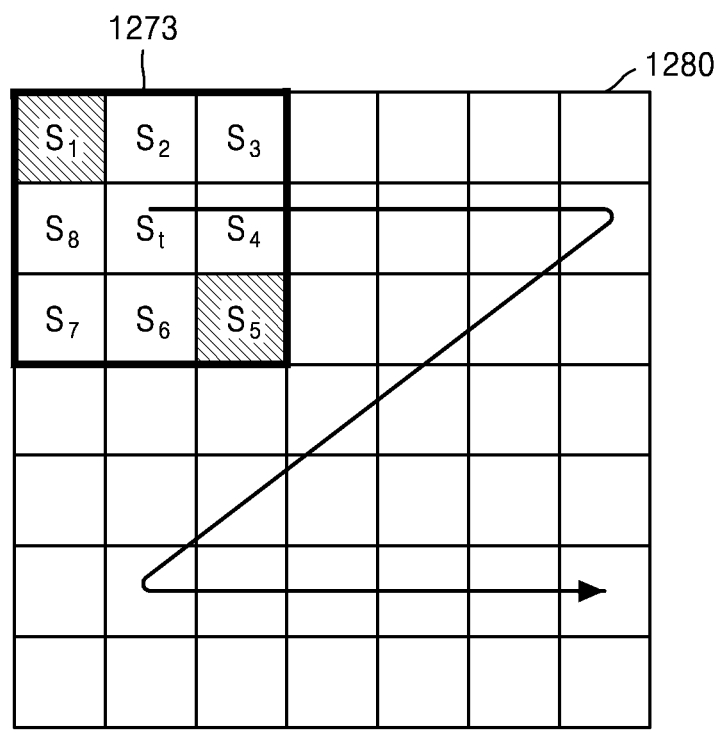
FIGS. 12 to 15 illustrate examples of shapes of filters according to an embodiment.
Figure 13:
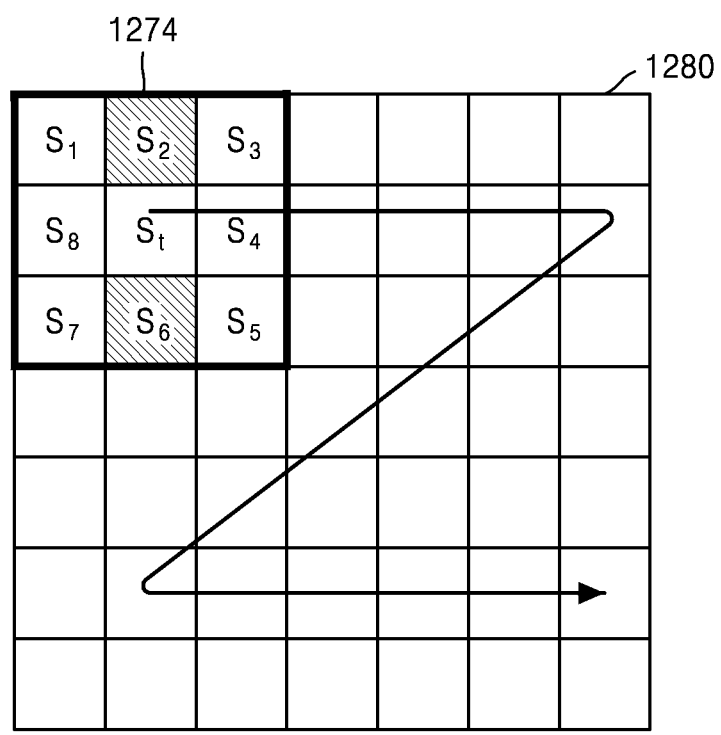
Figure 14:
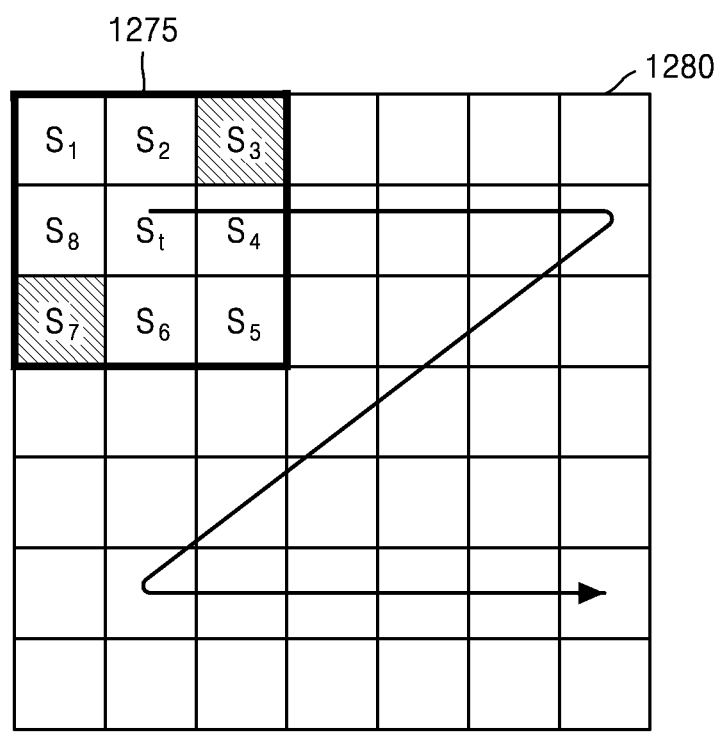
Figure 15:
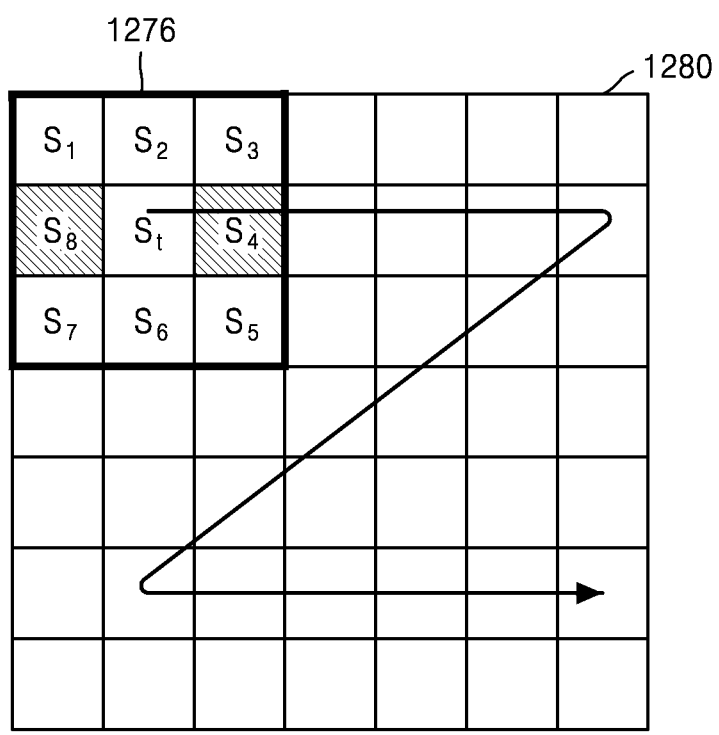

FIG. 11 is a flowchart illustrating an operation of restoring a missing event omitted in a dead pixel by an ESP, according to an embodiment.

The ESP first acquires the number of first states for surrounding pixels arranged in one direction crossing a target pixel (S111). The number of first states is acquired in each direction from a first direction to an n-th direction. A detailed description of acquiring the number of first states in each direction from the first direction to the n-th direction is given below with reference to FIGS. 12 to 15.

The ESP compares the maximum number among the numbers of first states in the first direction to the n-th direction with a preset reference value (S112). When the number of first states is greater than the reference value, the ESP may determine whether the target pixel is a dead pixel based on the state of the target pixel (S113). In an embodiment, the ESP determines the target pixel as a dead pixel when the target pixel is in the second state (S114). The dead pixel is a bad pixel that does not generate an event signal even though there is an event in which the intensity of light changes. If only the target pixel is in the second state even though an event occurs in surrounding pixels adjacent to the target pixel, the target pixel is highly likely to be a dead pixel and bad pixel not generating an event signal although there is an event in the target pixel. Also, the ESP determines the target pixel as a normal pixel when the target pixel is in the first state (S115).

Unlike the hot pixel determination described above with reference to FIG. 8, the reference value D_Th for determining the dead pixel may have a proportional relationship with a reset period for resetting the state map stored in the memory. This is because when the reset period is long, there is a high probability that the number of first states increases in the surrounding pixels adjacent to the target pixel. Accordingly, when the reset period is long, the ESP may be prevented from erroneously determining a normal pixel as a dead pixel by increasing the reference value D_Th to be large.

The EPS may correct an event occurring in a bad pixel by restoring a missing event in the dead pixel. The EPS determines the target pixel as a dead pixel by an event signal corresponding to the first state (S115). In an embodiment, the ESP may generate event data for an event signal of a target pixel determined to be a dead pixel. In an embodiment, the ESP may replace event data of the target pixel determined to be a dead pixel with event data of the surrounding pixels. In an embodiment, the ESP may replace the event data of the target pixel determined to be a dead pixel with event data of a surrounding pixel located in one direction having the maximum number of events.

FIGS. 12 to 15 illustrate examples of shapes of third to sixth filters 1273 to 1276 according to an embodiment.

The ESP may calculate line sum values for surrounding pixels arranged in one direction crossing a target pixel using the third to sixth filters 1273 to 1276 shown in FIGS. 12 to 15. In the third to sixth filters 1273 to 1276, shaded portions may have a value of 1 and bright portions may have a value of 0. The ESP may acquire the number of first states for surrounding pixels arranged in one direction penetrating the target pixel by using the third to sixth filters 1273 to 1276. The third to sixth filters 1273 to 1276 have a 3×3 size, and one direction may include two diagonal directions, a horizontal direction, and four vertical directions. The size of the filter is not limited to the 3×3 size, and may have various odd sizes, such as 5×5 (for example, FIG. 10), 7×7, 9×9, and 11×11.

The ESP may acquire the number N1 of first states in the first direction by calculating a line sum value for the surrounding pixels arranged in the first direction using the six filter 1273. The first direction may be a diagonal direction connecting $S_1$, $S_t$, and $S_8$.

In addition, the ESP may acquire the number N2 of first states in the second direction by calculating a line sum value for the surrounding pixels arranged in the second direction using the fourth filter 1274. The second direction may be a vertical direction connecting $S_2$, $S_t$, and $S_6$.

In addition, the ESP may acquire the number N3 of first states in the third direction by calculating a line sum value for the surrounding pixels arranged in the third direction using the fifth filter 1275. The third direction may be a diagonal direction connecting $S_3$, $S_t$, and $S_7$.

In addition, the ESP may acquire the number N4 of first states in the fourth direction by calculating a line sum value for the surrounding pixels arranged in the fourth direction using the sixth filter 1276. The fourth direction may be a horizontal direction connecting $S_4$, $S_t$, and $S_8$.

The EPS compares the maximum number (Max {N1 to Nn}) among the numbers N1 to N4 of first states in each of the first to fourth directions with a preset reference value (D_Th in FIG. 11). As a result of the comparison, if the maximum number is greater than the reference value, it is determined whether the target pixel is a dead pixel based on a state of the target pixel. When the target pixel is in the second state, the target pixel is determined as a dead pixel and when the target pixel is in the first state, the target pixel is determined as a normal pixel.

In another embodiment, the EPS compares each of the number N2 of first states in the first direction, the number N3 of first states in the third direction, and the number N4 of first states in the fourth direction with a reference value, and when at least one of the numbers N1 to N4 of first states in each of the first to fourth directions is greater than the reference value, the EPS determines whether the target pixel is a dead pixel based on a state of the target pixel.

Figure 16:
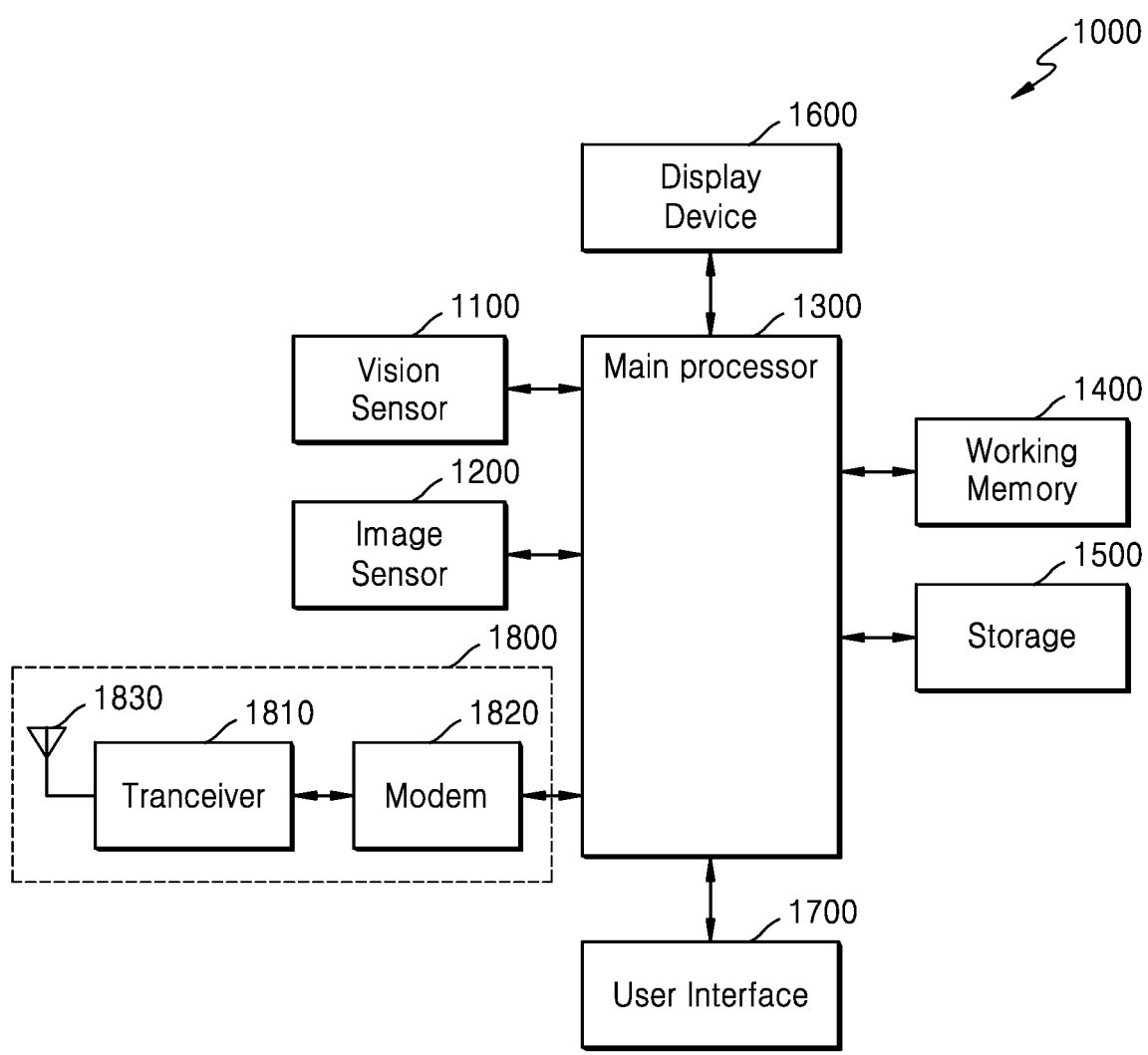
FIG. 16 is a block diagram illustrating an electronic device to which a vision sensor according to an embodiment is applied.

FIG. 16 is a block diagram illustrating an electronic device 1000 to which a vision sensor 1100 according to an embodiment is applied.

Referring to FIG. 16, the electronic device 1000 may include the vision sensor 1100, an image sensor 1200, a main processor 1300, a working memory 1400, a storage 1500, a display device 1600, a user interface 1700, and a communication unit 1800. However, the disclosure is not limited thereto, and the electronic device 1000 may be implemented such that at least some of the aforementioned components are omitted or additional components are added.

The vision sensors 100 and 100a described above with reference to FIGS. 1 to 15 may be applied as the vision sensor 1100. The vision sensor 1100 may sense an object to generate event signals and transmit the generated event signals to the main processor 1300.

The image sensor 1200 may generate image data, e.g., raw image data, based on a received optical signal and provide the image data to the main processor 1300.

The main processor 1300 may control the overall operation of the electronic device 1000 and may detect movement of an object by processing event data, that is, event signals, received from the vision sensor 1100.

The working memory 1400 may store data used for the operation of the electronic device 1000. For example, the working memory 1400 may temporarily store packets or frames processed by the main processor 1300. For example, the working memory 1400 may include volatile memory, such as dynamic random access memory (DRAM), synchronous RAM (SDRAM), and/or nonvolatile memory, such as phase-change RAM (PRAM), magneto-resistive RAM (MRAM), and resistive RAM (ReRAM), ferro-electric RAM (FRAM), and the like.

The storage 1500 may store data requested to be stored from the main processor 1300 or other components. The storage 1500 may include nonvolatile memory, such as flash memory, PRAM, MRAM, ReRAM, FRAM, and the like.

The display device 1600 may include a display panel, a display driving circuit, and a display serial interface (DSI). For example, the display panel may be implemented as various devices, such as a liquid crystal display (LCD) device, an LED display device, an organic LED (OLED) display device, and an active matrix OLED (AMOLED) display device. The display driving circuit may include a timing controller and a source driver necessary for driving the display panel. A DSI host built in the main processor 1300 may perform serial communication with the display panel through the DSI.

The user interface 1700 may include at least one of input interfaces, such as a keyboard, mouse, keypad, button, touch panel, touch screen, touch pad, touch ball, gyroscope sensor, vibration sensor, and acceleration sensor.

The communication unit 1800 may exchange signals with an external device/system through an antenna 1830. A transceiver 1810 and a modulator/demodulator (MODEM) 1820 of the communication unit 1800 may process signals exchanged with an external device/system according to wireless communication protocols, such as long term evolution (LTE), worldwide interoperability for microwave Access (WIMAX), global system for mobile communication (GSM), and code division multiple access (CDMA), Bluetooth, near field communication (NFC), wireless fidelity (Wi-Fi), radio frequency identification (RFIC), etc.

Components of the electronic device 1000, for example, the vision sensor 1100, the image sensor 1200, the main processor 1300, the working memory 1400, the storage 1500, the display device 1600, the user interface 1700, and the communication unit 1800 may exchange data based on one or more of various interface protocols, such as a universal serial bus (USB) interface, a small computer system interface (SCSI), a MIPI interface, I2C, a peripheral component interconnect express (PCIe) interface, a mobile PCIe interface, an advanced technology attachment (ATA) interface, a parallel ATA (PATA) interface, a serial ATA (SATA) interface, a serial attached SCSI (SAS) interface, an integrated drive electronics (IDE) interface, an enhanced IDE (EIDE), a nonvolatile memory express (NVMe) interface, a universal flash storage (UFS) interface, etc.

While the disclosure has been particularly shown and described with reference to embodiments thereof, it will be understood that various changes in form and details may be made therein without departing from the spirit and scope of the following claims.

What is claimed is:

1. A vision sensor comprising:
    a memory;
    a pixel array comprising a plurality of pixels configured to generate an event signal by detecting an event in which an intensity of incident light changes; and
    an event detection circuit configured to read the event signal from the pixel array and configured to process the event signal,
    wherein the event detection circuit is configured to:
        store, in the memory, a state map comprising:
            a first state corresponding to a presence of an event of each of the plurality of pixels, and
            a second state corresponding to an absence of the event, and
        correct the event occurring in a selected pixel, based on the state map stored in the memory,
    wherein the pixel array comprises a target pixel and surrounding pixels adjacent to the target pixel,
    wherein the event detection circuit is configured to determine the target pixel to be a hot pixel, based on the number of the first state acquired from the surrounding pixels, which is less than a preset hot pixel reference value,
    wherein the event detection circuit is configured to determine the target pixel to be a normal pixel, based on the number of the first state acquired from the surrounding pixels, which is greater than or equal to the preset hot pixel reference value,
    wherein the event detection circuit is configured to reset the state map stored in the memory at a predetermined time interval, and
    wherein the preset hot pixel reference value is inversely proportional to the predetermined time interval.

2. The vision sensor of claim 1, wherein the event detection circuit is configured to determine the target pixel to be the hot pixel based on the event signal corresponding to a second state.

3. The vision sensor of claim 1,
    wherein the event detection circuit is configured to determine the target pixel to be a dead pixel, based on the number of the first state acquired from the surrounding pixels arranged in one direction penetrating the target pixel, which is greater than a preset dead pixel reference value, and based on the target pixel that is in the second state.

4. The vision sensor of claim 3, wherein the event detection circuit is configured to acquire the number of the first state acquired from the surrounding pixels arranged in one direction penetrating the target pixel in each direction from a first direction to an n-th direction, and
    wherein the event detection circuit is configured to compare a maximum number among numbers of the first state acquired from the surrounding pixels arranged in one direction penetrating the target pixel in the first direction to the n-th direction with the preset dead pixel reference value.

5. The vision sensor of claim 3, wherein the event detection circuit is configured to reset the state map stored in the memory at a predetermined time interval, and
    wherein the preset dead pixel reference value is proportional to the predetermined time interval.

6. The vision sensor of claim 3, wherein the event detection circuit is configured to determine the target pixel to be the dead pixel by the event signal corresponding to the first state.

7. The vision sensor of claim 1, wherein the memory comprises a same number of flip-flops as a number of the plurality of pixels.

8. The vision sensor of claim 1, wherein the event detection circuit is configured to scan the plurality of pixels in units of columns to read the event signal, and
    wherein the event detection circuit is configured to store an event state for each of the plurality of pixels arranged in three consecutive columns in the memory.

9. The vision sensor of claim 8, wherein the plurality of pixels are arranged in a matrix of i rows and j columns, and
    wherein the memory comprises 3i flip-flops.

10. A method performed by a vision sensor, the method comprising:

detecting an event in which an intensity of incident light changes and reading an event signal from a pixel array comprising a plurality of pixels configured to generate an event signal;

storing, in a memory, a state map comprising:
- a first state corresponding to a presence of an event of each of the plurality of pixels, and
- a second state corresponding to an absence of the event; and correcting the event occurring in a selected pixel based on the state map stored in the memory, wherein the pixel array comprises a target pixel and surrounding pixels adjacent to the target pixel, wherein the correcting the event occurring in the selected pixel based on the state map stored in the memory, comprises: determining hot pixel wherein the determining hot pixel comprises:
- acquiring a number of the first state from the surrounding pixels, and
- comparing the number of the first state with a preset hot pixel reference value resetting the state map stored in the memory at predetermined time interval, wherein, based on the number of the first state, which is less than the preset hot pixel reference value, the target pixel is determined to be a hot pixel, and wherein, based on the number of the first state, which is greater than or equal to the preset hot pixel reference value, the target pixel is determined to be a normal pixel wherein the preset hot pixel reference value is inversely proportional to the predetermined time interval.

11. The method of claim 10, further comprising determining the target pixel to be the hot pixel by an event signal corresponding to a second state.

12. The method of claim 10, wherein the correcting the event occurring in the selected pixel based on the state map stored in the memory, further comprises determining dead pixel wherein the determining dead pixel comprises:
- acquiring a number of the first state for the surrounding pixels arranged in one direction penetrating the target pixel, and
- comparing the number of the first state with a preset dead pixel reference value, and wherein the target pixel is determined to be a dead pixel, based on the number of the first state, which is greater than the preset dead pixel reference value and based on the target pixel that is in the second state.

13. The method of claim 12, wherein the determining dead pixel comprises resetting the state map stored in the memory at a predetermined time interval, wherein the preset dead pixel reference value is proportional to the predetermined time interval.

14. The method of claim 12, wherein the determining dead pixel comprises:
- acquiring the number of the first state in each direction from a first direction to an n-th direction, and
- comparing a maximum number among numbers of the first state in the first direction to the n-th direction with the preset dead pixel reference value.

15. The method of claim 13, further comprising determining the target pixel to be a dead pixel by an event signal corresponding to the first state.

16. An image processing device comprising a vision sensor and an image sensor, wherein the vision sensor comprises:

a pixel array comprising a plurality of pixels configured to generate an event signal by detecting an event in which an intensity of incident light changes; and an event detection circuit configured to read the event signal from the pixel array and configured to process the event signal, wherein the event detection circuit is configured to store, in a memory, a state map comprising:
- a first state corresponding to a presence of an event of each of the plurality of pixels, and
- a second state corresponding to an absence of an event, and wherein the event detection circuit is configured to correct an event occurring in a selected pixel, based on the state map stored in the memory, wherein the pixel array comprises a target pixel and surrounding pixels adjacent to the target pixel, wherein the event detection circuit is configured to acquire a number of the first state from the surrounding pixels, wherein the event detection circuit is configured to determine the target pixel to be a hot pixel, based on the number of the first state, which is less than a preset hot pixel reference value, wherein the event detection circuit is configured to determine the target pixel to be a normal pixel, based on the number of the first state, which is greater than or equal to the preset reference hot pixel value, wherein the event detection circuit is configured to reset the state map stored in the memory at a predetermined time interval, and wherein the preset hot pixel reference value is inversely proportional to the predetermined time interval.

* * * * *